Dec. 14, 1971    B. G. PURSWELL    3,626,599

AUTOMATIC TIRE TREAD GAUGE

Filed March 5, 1969    3 Sheets-Sheet 1

INVENTOR
B.G. PURSWELL
BY Robert R. Priddy
ATTORNEY

Dec. 14, 1971   B. G. PURSWELL   3,626,599
AUTOMATIC TIRE TREAD GAUGE
Filed March 5, 1969   3 Sheets-Sheet 2

INVENTOR
B.G. PURSWELL
BY Robert R. Priddy
ATTORNEY

United States Patent Office 3,626,599
Patented Dec. 14, 1971

3,626,599
AUTOMATIC TIRE TREAD GAUGE
Bobby G. Purswell, Guntersville, Ala., assignor to
Ashland Oil, Inc., Houston, Tex.
Filed Mar. 5, 1969, Ser. No. 804,515
Int. Cl. G01b 3/28, 5/18
U.S. Cl. 33—169 B          2 Claims

ABSTRACT OF THE DISCLOSURE

The disclosure relates to an automatic tire tread gauge for continuously measuring the thread depth of a tire. The apparatus has built-in resilient means to compensate for out-of-round variations in the tire to be tested, and transmits a continuous record of tire tread depth to a recording apparatus.

BACKGROUND OF THE INVENTION

Many tire tread gauges have been proposed in the prior art, but virtually all of them are hand-held instruments that may make one measurement at a time. These tire tread measuring apparatus require two men to do a substantial number of measurements, one to measure the tire tread depth, and one to record the measurements.

Furthermore, the manual tire tread gauges are generally limited to visual sighting, and have the obvious disadvantages of inaccuracy in the sighting and cumbersomeness in operation.

When a major tire company tests the tire, it will take a minimum of 300 measurements for each tire, and will take measurements on this tire every 2,000 miles of travel. The tire is tested for somewhere between 6,000 and 10,000 miles, necessitating 1,000 to 1,500 measurements for each tire that is tested. At the present time, all of these measurements must be conducted by hand. It is not unusual for a large tire company to test over 4,000 tires in one year. As can readily be seen, there is presently a great need for an automatic tire tread testing apparatus to save on the vast number of man-hours required for hand measuring.

Several different types of automatic tire tread gauges have been proposed in the prior art but these have generally met with difficulties due to variations in tire tread or wheel track with different types of vehicles. This has necessitated complex mechanisms with the disadvantages inherent in the complexity of the compensating system used for these variances.

There are also a large number of prior art devices which measure the roundness or concentricity of an object with a continuous follower arrangement. Generally, this type of apparatus does not readily adapt to the tire tread measuring art because the out-of-round variations present in even the most carefully selected test tires would render a measurement of this type useless.

SUMMARY OF THE INVENTION

It is therefore an object of this invention to provide an automatic tire tread testing apparatus for continuously indicating the depth of the tire tread.

It is furthermore an object of this invention to provide a novel apparatus for compensating in the variations of a tire surface due to the out-of-roundness of the tire in order to accurately measure the tire tread depth.

It is another object of this invention to provide a new and novel sensing means for determining tire tread depth.

It is another object of this invention to provide means for compensating in the different variations of tread style present in the market place, and means for adapting the apparatus for continuously indicating the tire tread depth of these tires.

DETAILED DESCRIPTION OF THE PREFERRED EMBODIMENTS

Figure 1:
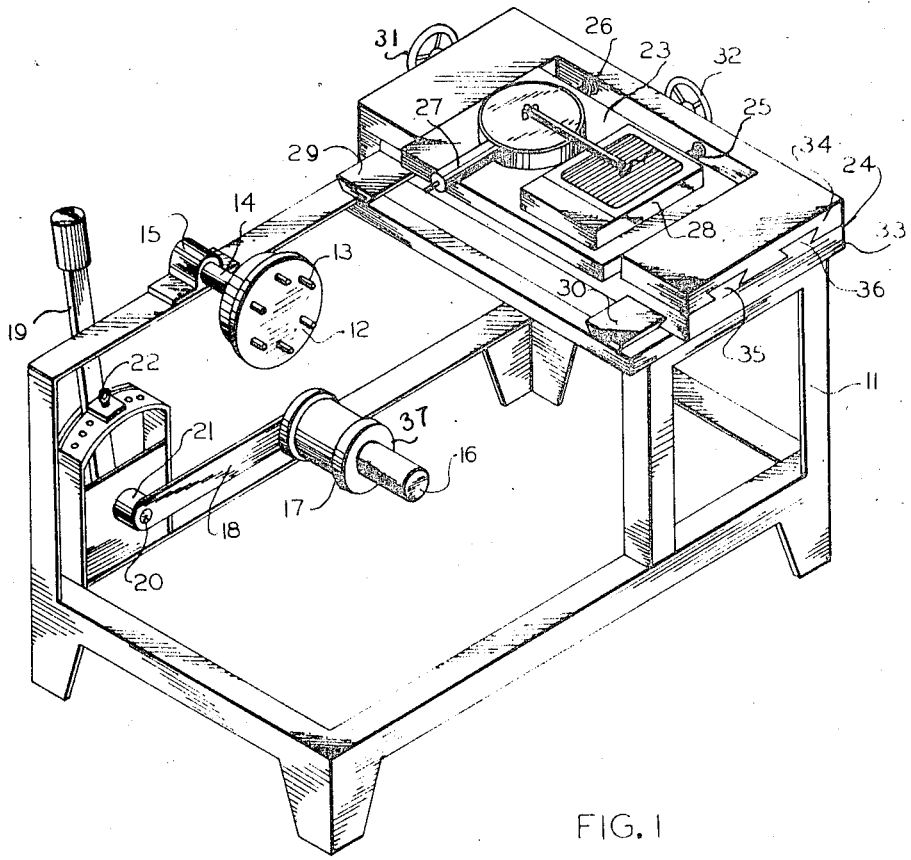
FIG. 1 is an isometric view of the preferred form of the invention.

In accordance with the invention as illustrated in FIG. 1, a large subframe 11 is provided with a support means 12 for supporting a tire during rotation about its axis. This support means may take the form of a hub with conventional stud bolts as illustrated at 13, or it may be a quick release wing nut type conventionally used in racing cars to quickly mount and demount tires. Support means 12 is freely rotatable with axle 14 by virtue of the bearing 15 mounted on frame 11.

After a tire has been mounted on support means 12, it is rotated by means of the knurled drive roller 16 which is attached to motor 17. Motor 17 is preferably a reversible motor capable of rotating in both directions to thereby drive or rotate the tire in either direction. Alternatively a transmission or other means could be provided to reverse the direction of rotation and thereby drive or rotate the tire in either direction. Motor 17 is mounted on a crank arm 18 which is actuated by lever 19. Lever 19 and crank 18 are freely rotatable about axis 20 by virtue of a sleeve bearing mounted in support boss 21. The lever 19 may be located in any one of several positions by means of the adjusting device 22 to compensate for various diameters in the tires to be tested. After mounting the tire on support means 12, the operator merely advances the knurled drive cylinder 16 upwardly by means of lever 19, until it comes into contact with the tire surface. The lever is then locked into place by means of flange means 22.

A first carriage means 23 is resiliently mounted within a larger carriage generally designated as 24, which is mounted on frame 11. This first carriage means 23 is resiliently urged along the radial axis of a tire mounted on support means 12 by means of springs 25 and 26. The tread depth sensor 27 and its associated recorder 28 are securely mounted on first carriage means 23 by means of any suitable fastening device (not shown). The carriage table 24 is provided with radial tracking members 29 and 30 for moving the carriage assembly along a radial direction with respect to the pneumatic tire mounted on support means 12. After a tire is mounted on support means 12, the carriage assembly is moved along a radial dimension until probe means 27 comes into contact with the tire surface. This movement is brought about by crank wheel 31 and a rack and pinion gear arrangement (not shown) mounted on frame 11.

Due to the many variations in tire sizes, and tread patterns, it is then necessary to adjust the sensor 27 laterally, or perpendicularly, to the radial direction of movement in order that the sensing probe of tread gauge 27 may be aligned with the tire tread. This transverse or perpendicular movement is accomplished by wheel 32 which is connected to another rack and pinion arrangement (not shown) mounted on the lower subframe 33 of carriage 24. The upper subframe member 34 then moves laterally or transversely on guide rails 35 and 36.

It would also be within the scope of the present invention to provide only the transverse adjustment for the carriage assembly. In this embodiment, the radial adjustment could be entirely resilient, thereby eliminating the guide rails 29 and 30 and their attendant rack and pinion adjustment.

In another form of the present invention, the support means 12 could be mounted on a movable beam or bell crank to provide for the radial and transverse adjustment necessary. In this embodiment, the only movement of the recording carriage would be the resilient movement provided by springs 25 and 26, with the mounting means for the tire providing the additional radial and transverse adjustments necessary.

After the tread gauge 27 has been aligned with the tire tread, the carriage assembly 24 is then moved radially into contact with the tire surface by means of wheel 31, until the spring means 25 and 26 are sufficiently compressed to allow for any out-of-round variations in the tire surface.

Figure 3:
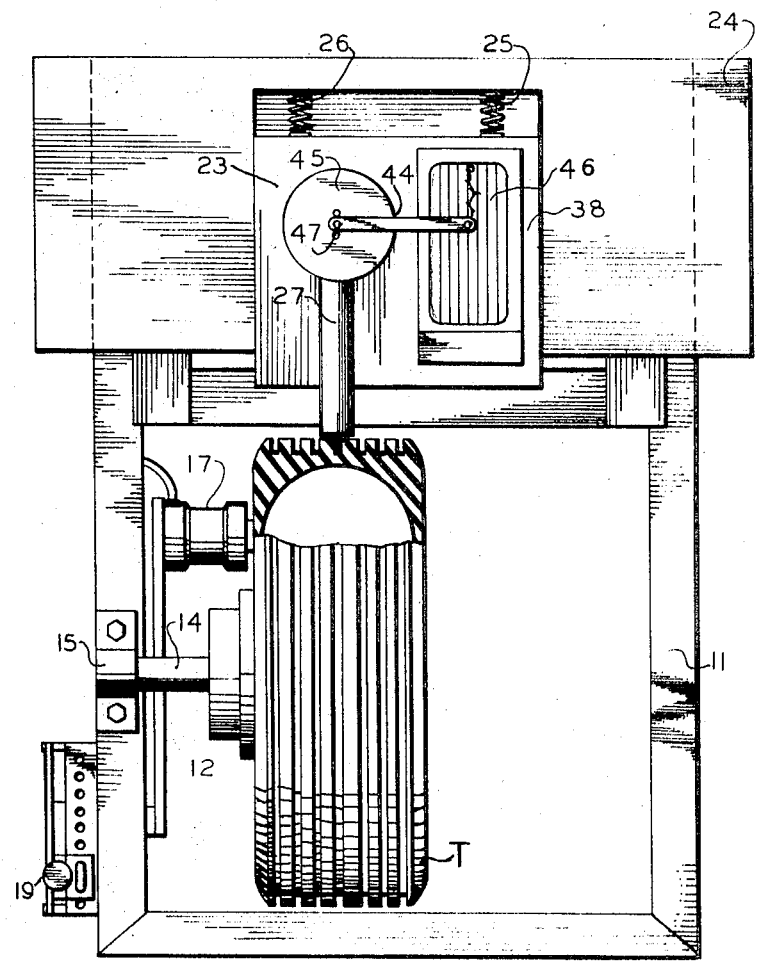
FIG. 3 is a top view of the preferred form of the present invention.

As can be seen from FIG. 3, when the pneumatic tire T is mounted on support means 12, and as the tire is slowly rotated, the tread gauge will track or follow the surface of the tire by virtue of resiliency of springs 25 and 26.

Figure 4:
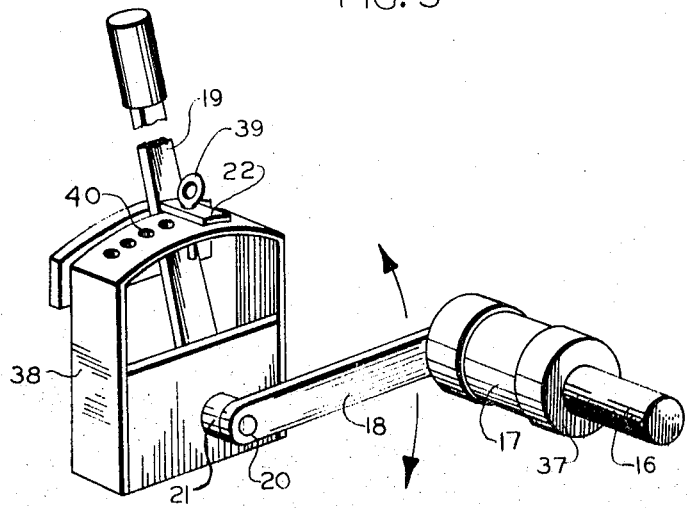
FIG. 4 is an isometric view of the drive means used in the preferred form of the present invention.

The tire is rotated past probe 27 by virtue of the drive means illustrated in FIG. 4. The drive means comprises a knurled drive cylinder 16 which is urged into contact with the tire surface. This knurled drive cylinder is driven by motor 17 at a very low speed. Preferably, motor 17 has a reducing transmission or other gear arrangement 37 coupled between the motor output shaft, and the knurled drive cylinder. The relative size differential between the drive cylinder and the tire surface also acts to slow the rotation of tire T to a very low peripheral speed. Motor 17 is mounted on the end of a bell crank formed by crank arm 18 and lever 19 which rotate about pivot 20. The pivot shaft 20 is journaled into boss 21 which is supported by subframe 38 and securely attached to the larger frame 11 as indicated in FIG. 1. Thus, by moving lever 19, the operator may advance the motor and knurled drive cylinder into contact with the tire T for positive rotation thereof.

Locking means 22 is provided on lever 19 to lock the bell crank and the knurled drive cylinder 16 into a positive driving relationship with respect to tire T. It should be understood that any suitable arrangement, either a positive pin arrangement as illustrated in FIG. 4, or a frictional engaging means could be used herein without departing from the scope of the present application. As illustrated, the operator merely inserts pin 39 into any one of the plurality of holes generally designated as 40 to lock lever 19 into place.

Motor 17 is controlled by a suitable switch (not shown) which may be located on lever 19, on frame 11, or near the recording apparatus on carriage member 23 as desired.

As illustrated in FIG. 3, springs 25 and 26 resiliently urge carriage member 23 along a radial direction with respect to pneumatic tire T until the measuring probe 27 comes into contact with tire T.

Figure 2:
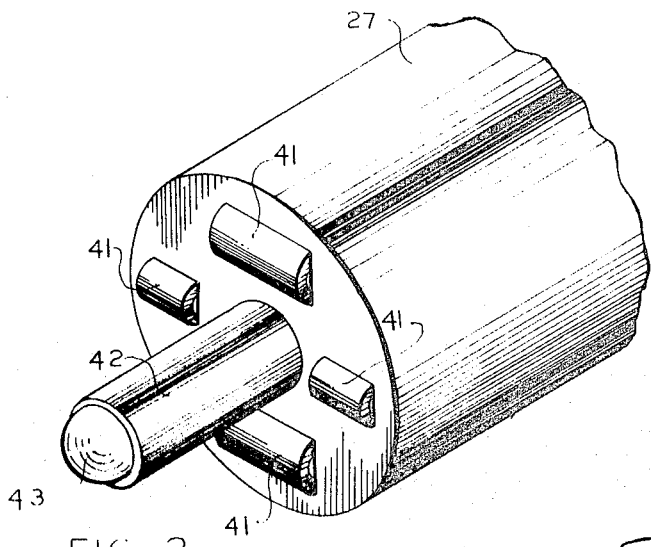
FIG. 2 is an isometric view of a new and novel sensing probe of the present invention.

As illustrated in FIG. 2, the end of measuring probe 27 has a plurality of rollers, generally designated as 41, which contact the tread lands or shoulders of the tire tread to enable the probe 27 to be urged against the tire T while it is being rotated. While FIG. 2 disclosed the preferred form of the embodiment, it is clear that any other sort of anti-friction arrangement such as large ball type bearings, could be utilized on the end probe 27 to minimize the friction between the tire T and probe 27 without departing from the scope of the present invention. Coaxially mounted within probe 27 is sensing means 42 which is mounted for reciprocal and axial movement along the axis of the cylindrical probe 27. Sensing means 42 is equipped with a ball 43, which is mounted therein in a manner similar to a ball-point pen. Sensing means 42 is supplied with a lubricant such as graphite or a light machine oil to reduce the friction between the ball 43, and the sensing means 42. Sensing means 42 is resiliently urged toward its extended position illustrated in FIG. 2 by means of a spring or other resilient means (not shown) which is mounted within probe 27. Thus, ball 43 is resiliently urged into contact with the tread base or the bottom of the tire tread grooves. Thus when probe 27 is urged against tire T, rollers 42 contact the tread lands of the tire tread grooves while ball 43 contacts the tread base of the tire tread grooves. As tire T rotates, sensor 42 then reciprocates and thereby reflects the difference in dimension between the tread land and the tread base. This relative movement is then reflected by the movement of the indicating pin 44 illustrated in FIG. 3. As sensing means 42 moves back and forth along an axial path within probe 27, the reciprocal movement is translated into a second reciprocal movement transverse to the first in recording pin 44 by means of a suitable transmission (not shown) mounted in the head 45 of probe 27.

The recorder 27 is preferably electrically driven, and equipped with a continuous roll of graph paper 46 which is advanced past indicator pen 44. As indicator 44 moves in a reciprocal path, its movements are reflected on graph 46 as it is moved past the marking pen. If desired, a zero adjust mechanism 47 may be fitted to marking pen 44 to correlate the pen-point with the specific zero point on graph 46.

It should be understood that the present invention is not limited to a recording pen and graph paper arrangement, but could be similarly utilized with a magnetic or electrical transducer, wherein the relative movement between probe 27 and sensing member 42 is translated into electrical pulses, or an electrical wave form. Such a wave form or pulse system could be utilized in an electronic computing system, to assist in reducing the amount of raw data gathered by the present invention into simple statistical terms. Alternatively, the output from probe 27 could be translated into punch cards to assist the operator in evaluating the results of this test.

Figure 5:
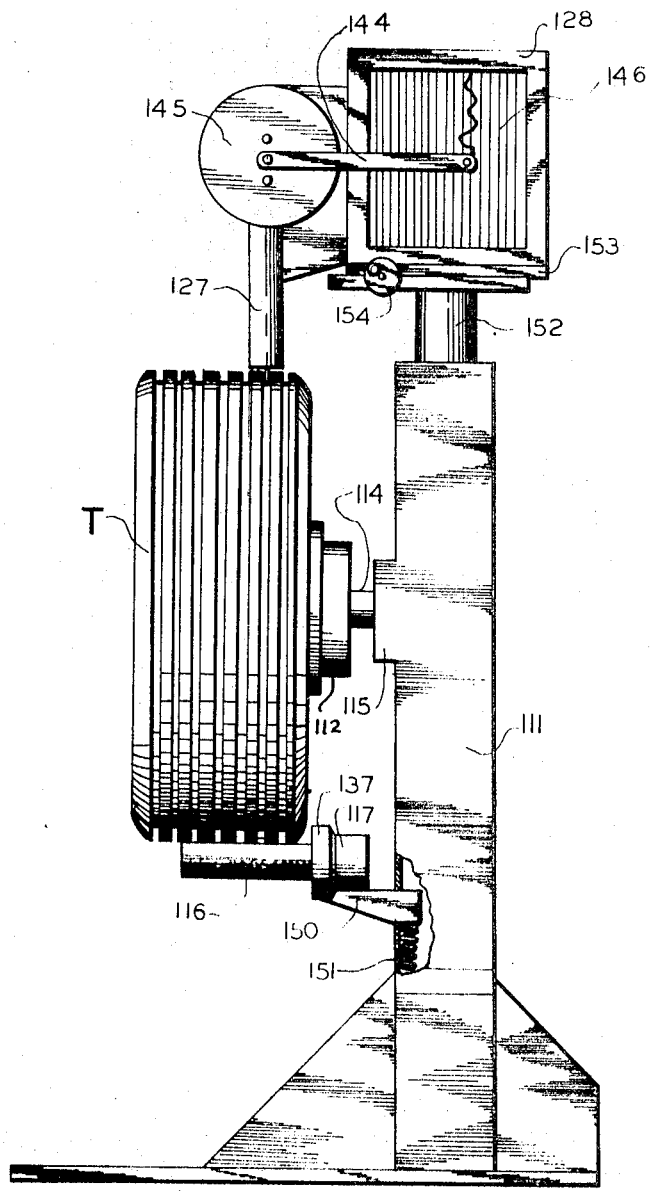
FIG. 5 is a plan or side view of an alternate form of the present invention.

An alternate form of the invention is illustrated in FIG. 5. In this form of the present invention, tire T is mounted upon support means 112 which revolves around axle 114. Axle 114 rotates freely within support boss 115 mounted on frame 111. Knurled drive cylinder 116 is mounted on the output shaft of drive means 117 which may be reduced in speed by means of a transmission 137, or other speed-reduction device. The drive assembly is mounted on a movable bracket 150 which is resiliently urged upwardly within frame 111 by means of spring 151. Bracket 150 is capable of a reciprocal movement with respect to the radial axis of axle 114 to enable the operator to test different tires of varying diameters. Mounted in the upper part of frame 111 is a subframe member 152 which is resiliently urged downwardly along a radial axis of pneumatic tire T towards axle 114.

Alternatively, subframe 152 and bracket 150 may be equipped with a rack and pinion gear device to move them into and out of a tire-engaging relationship. In the event that subframe 152 is equipped with a rack and pinion or other type of mechanical movement, it must also have a resilient path of travel of approximately ½ inch to compensate for any out-of-round variations encountered in the tires to be tested. This resilient means (not shown) will continually urge the subframe 152 along a radial axis of pneumatic tire T. Mounted on subframe 152 is carriage member 153 which is equipped for transverse movement with respect to a movement of subframe 152. This movement is controlled by wheel 154, and a rack and pinion arrangement (not shown) which moves carriage member 153 with respect to subframe 152.

The relative operation of the sensing probe 127, the inking arm 144, the electric recorder 128, and the graph 146 are for all practical purposes identical to the movements described for these members in FIG. 3.

In order to test a tire T on the alternate embodiment illustrated in FIG. 5, the operator first would depress the frame 150, elevate subframe 152, and mount a pneumatic tire on the support means 112 which rotates on axle 114. After mounting the tire, the drive means mounted on bracket 150 would be brought into a driving relationship with respect to tire T, and probe 127 would be moved transversely by means of wheel 154 to align with one of the tire tread grooves. Once probe 127 had been aligned with the grooves in the pneumatic tire, subframe 152 would be lowered until probe 127 was brought into its resilient relationship with pneumatic tire T. The resilient movement of frame 152 would then compensate for any out-of-round variations in pneumatic tire T.

While certain representative embodiments and details have been shown with the purpose of illustrating the present invention, it will be apparent to those skilled in the art that various changes and modifications may be made therein without departing from the scope or spirit of the invention.

I claim:

1. An automatic tire gauge for continuously measuring tire tread depth while compensating for out-of-round variations in said tire comprising
   (a) support means mounted on a frame for supporting a pneumatic tire for rotation about its center axis;
   (b) drive means mounted on said frame for rotating said pneumatic tire about its center axis;
   (c) a first carriage means mounted on said frame adjacent said support means for movement radially of said center axis of rotation;
   (d) a second carriage means mounted for adjustment parallel to said center axis of rotation, one of said carriages being mounted on the other of said carriages, the other of said carriages being mounted on said frame;
   (e) gauge means mounted on said one carriage means, said gauge means having a first and second portion for contacting said pneumatic tire, said first portion contacting the tread base and said second portion contacting the tread land, said first portion being mounted for reciprocal movement within said second portion and having a first resilient means to bias said first portion outwardly and radially of said center axis of rotation;
   (f) a second resilient means for urging said radially movable carriage means radially of the center axis of said tire to bring the second portion of said gauge means into contact with the tread land of said pneumatic tire, whereby said gauge means will compensate for out-of-round variations in said tire by resiliently tracking the surface of the tread as the tire is rotated about its center axis;
   (g) indicating means for indicating the difference in depth between the tread land and the tread base as measured by said gauge means.

2. An automatic tire tread gauge for continuously measuring tire tread depth while compensating for out-of-round variations in said tire as claimed in claim 1, wherein said second resilient means urges both the first and second carriage means radially of the center axis of rotation.

References Cited

UNITED STATES PATENTS

| | | | |
|---|---|---|---|
| 848,846 | 4/1907 | Patterson | 33—203.11 |
| 3,170,243 | 2/1965 | Williams | 33—169 |
| 3,237,310 | 3/1966 | Reiner | 33—143 |
| 2,713,209 | 7/1955 | Brown | 33—147 |
| 3,363,320 | 1/1968 | Helms | 33—172 |
| 3,497,960 | 3/1970 | Joyce et al. | 33—172 |
| 3,183,481 | 5/1965 | McCrory | 33—175 X |
| 3,125,811 | 3/1964 | McCrory | 269—60 |

LEONARD FORMAN, Primary Examiner

C. E. PHILLIPS, Assistant Examiner